(12) United States Patent
Sinha

(10) Patent No.: US 7,477,894 B1  
(45) Date of Patent: Jan. 13, 2009

(54) METHODS AND APPARATUS FOR HANDLING WIRELESS ROAMING AMONG AND ACROSS WIRELESS AREA NETWORKS

(75) Inventor: Vishal Sinha, Santa Clara, CA (US)

(73) Assignee: Foundry Networks, Inc., Alviso, CA (US)

( * ) Notice: Subject to any disclaimer, the term of this patent is extended or adjusted under 35 U.S.C. 154(b) by 113 days.

(21) Appl. No.: 10/785,596

(22) Filed: Feb. 23, 2004

(51) Int. Cl.
  H04Q 7/20 (2006.01)
  H04Q 7/00 (2006.01)

(52) U.S. Cl. ............. 455/432.1; 455/436; 370/331

(58) Field of Classification Search .......... 455/432.1, 455/432.2, 436, 438, 442; 370/331
See application file for complete search history.

(56) References Cited

U.S. PATENT DOCUMENTS

| | | | |
|---|---|---|---|
| 5,325,362 A | 6/1994 | Aziz | |
| 5,442,633 A | 8/1995 | Perkins et al. | |
| 5,825,759 A | 10/1998 | Liu | |
| 6,160,804 A | 12/2000 | Ahmed et al. | |
| 6,161,008 A | 12/2000 | Lee et al. | |
| 6,230,012 B1 | 5/2001 | Willkie et al. | |
| 6,256,300 B1 | 7/2001 | Ahmed et al. | |
| 6,535,493 B1* | 3/2003 | Lee et al. | 370/329 |
| 6,822,955 B1 | 11/2004 | Brothers et al. | |
| 7,190,668 B1 | 3/2007 | Francis et al. | |
| 2003/0185172 A1* | 10/2003 | Rue | 370/331 |
| 2003/0210671 A1* | 11/2003 | Eglin | 370/338 |
| 2004/0105440 A1* | 6/2004 | Strachan et al. | 370/389 |
| 2004/0255033 A1* | 12/2004 | Edney et al. | 709/229 |

OTHER PUBLICATIONS

Andrew T. Campbell et al., "IP Micro-Mobility Protocols", ACM Sigmobile Mobile Computer and Communication Review (MC2R), Oct. 2001, pp. 1-7.
G. Dommety, "Key and Sequence Number Extensions to GRE", RFC 2890, Sep. 2000.
Cristina Hristea et al., "A network infrastructure for IP mobility support in metropolitan areas", Computer Networks 38 (2002), 2002, pp. 181-206.
Charles E. Perkins et al., "Mobility Support in IPv6", Proceedings of MobiCom 96, Nov. 1996.
James Kempf et al., "Bidirectional Edge Tunnel Handover for IPv6", IETF draft-kempf-beth-ipv6-02.txt, Mar. 2002.
Karim El-Malki et al., "Low Latency Handoff in Mobile IPv4", IETF draft-ietf-mobileip-lowlatency-handoffs-v4-01.txt, May 2001.

(Continued)

Primary Examiner—George Eng
Assistant Examiner—Wesley L Kim
(74) Attorney, Agent, or Firm—Nixon Peabody LLP; David B. Ritchie

(57) ABSTRACT

Wireless roaming in a computer network may be handled through a solution provided on one or more switches in the network. A roam request sent by a switch corresponding to the user's new location may be received by the other switches in the network. If the user is known to any of these switches, then they may execute steps to accommodate the roaming. The tasks performed may vary based on whether the roaming is on layer 2 or layer 3, whether the switch is a home agent for the client, and/or whether the switch already corresponds to the user's new location.

15 Claims, 15 Drawing Sheets

OTHER PUBLICATIONS

G. Montenegro, "Reverse Tunneling for Mobile IP", RFC 2344, May 1998.

C. Perkins, "IP Mobility Support", RFC 2002, Oct. 1996.

R. Ramjee et al., "Hawaii: A Domain-based Approach for Supporting Mobility in Wide-area Wireless Networks", Proc. IEEE Int'l Conf. Network Protocols, 1999.

Hesham Soliman et al., "Hierarchical MIPv6 mobility management (HMIPv6)", IETF draft-ietf-mobileip-hmipv6-04.txt, Jul. 2001.

Hesham Soliman et al., "Per-flow movement in MIPv6", IETF draft-soliman-mobileip-flow-move-00.txt, Jul. 2001.

P. Srisuresh et al., "Traditional IP Network Address Translator (Traditional NAT)", RFC 3022, Jan. 2001.

3GPP, "GPRS Service Description Rel. 1999", 3GPP TS 23.060.

G. Tsirtsis et al., "Network Address Translation—Protocol Translation (NAT-PT)", RFC 2766, Feb. 2000.

Andras G. Valko, "Cellular IP: A New Approach to Internet Host Mobility", ACM SIGCOMM Computer and Communication Review, Jan. 1999, pp. 1-16.

Jon Chiung-Shien Wu et al., "Intelligent Handoff for Mobile Wireless Internet", Mobile Networks and Applications, 2001, pp. 67-79, vol. 6.

Xinhua Zhao et al., "Flexible Network Support for Mobile Hosts", ACM MONET, 2001.

Yi-Bing Lin et al., Wireless and Mobile Network Architectures, 2001, John Wiley & Sons, Inc.

W. Richard Stevens, TCP/IP Illustrated, vol. 1, The Protocols, 1994, Addison Wesley.

* cited by examiner

US 7,477,894 B1

METHODS AND APPARATUS FOR HANDLING WIRELESS ROAMING AMONG AND ACROSS WIRELESS AREA NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of wireless networking. More particularly, the present invention relates to a solution for wireless roaming among and across wireless local area networks.

BACKGROUND OF THE INVENTION

Wireless network has significantly grown in popularity. The IEEE 802.11 standards are currently the most widely used wireless networking standards. Wireless network can present unique problems when clients "roam". Roaming may be defined as switching from one access point to another access point.

The ability of a mobile client to move freely between various segments of a wireless domain without experiencing any observable service degradation or disruption is called seamless roaming. Roaming can occur at various layers. If a client roams between two segments that are part of the same Internet Protocol (IP) subnet, then the roaming is termed layer 2 roaming. If the client roams between segments that have different IP subnets, then the roaming is termed layer 3 roaming.

The Inter Access Point Protocol (IAPP) has been suggested by the IEEE 802.11 committee to address the layer 2 roaming of clients in wireless networks. It runs on wireless access points and uses a combination of Transmission Control Protocol (TCP) and User Datagram Protocol (UDP) to facilitate roaming. However, it fails to support layer 3 roaming as it relies on layer 2 broadcast messages to find other access points.

The IPv4 (RFC 3344) standard has been proposed by the Internet Engineering Task Force (IETF) and it attempts to address Layer 3 roaming. Though it is a generic solution, it suffers several limitations. For example, the standard relies on software upgrades to the clients to run some piece of the protocol. This requires that all users upgrade their mobile clients (laptops, mobile phones, etc.) before they can use this standard. Additionally, this standard only addresses the layer 3 roaming aspect of the generic problem.

What is needed is a solution that can seamlessly handle both layer 2 and layer 3 roaming.

BRIEF DESCRIPTION OF THE INVENTION

Wireless roaming in a computer network may be handled through a solution provided on one or more switches in the network. A roam request sent by a switch corresponding to the user's new location may be received by the other switches in the network. If the user is known to any of these switches, then they may execute steps to accommodate the roaming. The tasks performed may vary based on whether the roaming is on layer 2 or layer 3, whether the switch is a home agent for the client, and/or whether the switch already corresponds to the user's new location.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
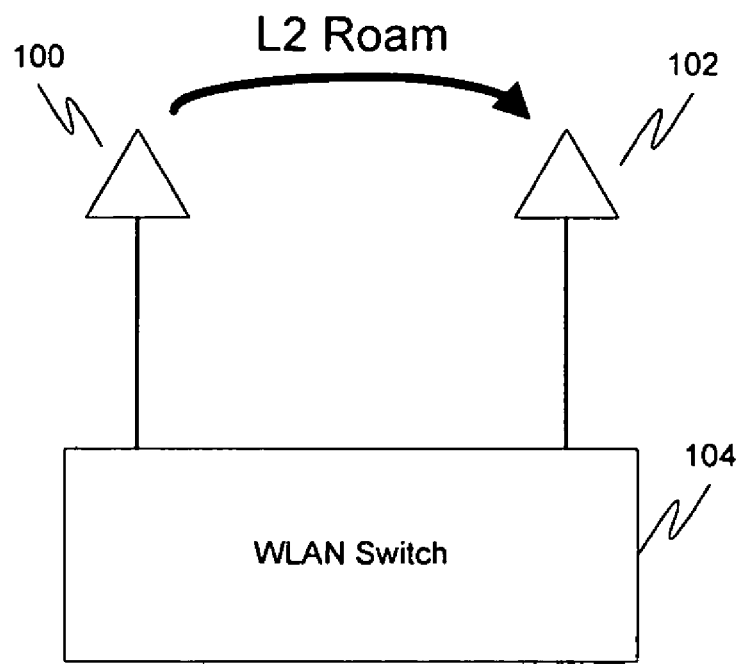
FIG. 1 is a diagram illustrating layer 2 roaming on a single WLAN switch in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Furthermore, the present invention is described in the context of a switch. However, one of ordinary skill in the art will recognize that the term switch should be read broadly, so as to include any device that directs packets, including a router and a gateway.

Layer 2 and Layer 3 roaming are based on the Open Systems Interconnection (OSI) network standard of layers. Layer 2 represents the data-link layer, while layer 3 represents the network layer. For purposes of this document, layer 2 roaming may involve the roaming from one access point (AP) to a new AP having the same virtual local area network (VLAN) and subnet. Layer 3 roaming may involve the roaming from one AP to a new AP that has either a different VLAN, or the same VLAN but different subnet.

Clients in a wireless network can roam from one access point to another. A combination of access points, wireless local area network (WLAN) switches, and the underlying topology presents a challenge to manage roaming clients. The present invention provides a solution that allows WLAN switches to properly manage wireless roaming.

One embodiment of the present invention involves the use of new protocols between the access point (AP) and the WLAN switch, and between WLAN switches. The protocol between the AP and the WLAN switch may be called the Switch Access Point Protocol (SAPP). The protocol between the WLAN switches may be called the Inter Switch Roaming Protocol (ISRP). Use of these protocols is optional, however, and one of ordinary skill in the art will recognize that the present invention may be practiced without the use of either of these protocols.

SAPP may begin with a discovery phase in which the APs send a discovery request frame, causing any WLAN switch receiving the frame to respond with a discover reply frame. From all the discovery replies received, an AP may select a WLAN switch with which to associate, and then may send out a join request. The WLAN switch receiving the join request may then send a join reply. Upon receiving the join reply, the AP may establish a TCP session with the WLAN switch. Once the TCP session is up, the Access Point may communicate to the WLAN switch all the client related events.

Each of the WLAN switches within a mobility domain may be configured with the IP addresses of all the other WLAN switches in that domain. This helps to establish a full mesh of TCP connections amongst them.

Once the TCP connection is established, the WLAN switch may send out an initialization message via ISRP to the peer WLAN switch. If the peer accepts the initialization message, it may reply with its own initialization message followed by a keep alive message.

When roaming is detected, the new WLAN switch may send a roam mobile message to all the other WLAN switches in the mobility domain. When a WLAN switch receives this message, it may check to see if it knows anything about the client. If it does, then it may invoke a roaming algorithm to handle the message. Otherwise, it may simply ignore the message.

FIG. 1 is a diagram illustrating layer 2 roaming on a single WLAN switch in accordance with an embodiment of the present invention. In this case, the client has roamed from one AP 100 to another AP 102, both of which are connected to the same WLAN switch 104. There is not much that needs to be done in this case. The WLAN switch 104 will still be the home agent (HA). The client's policy, however, should be moved from the old AP port to the new AP port on the WLAN switch 104.

Figure 2:
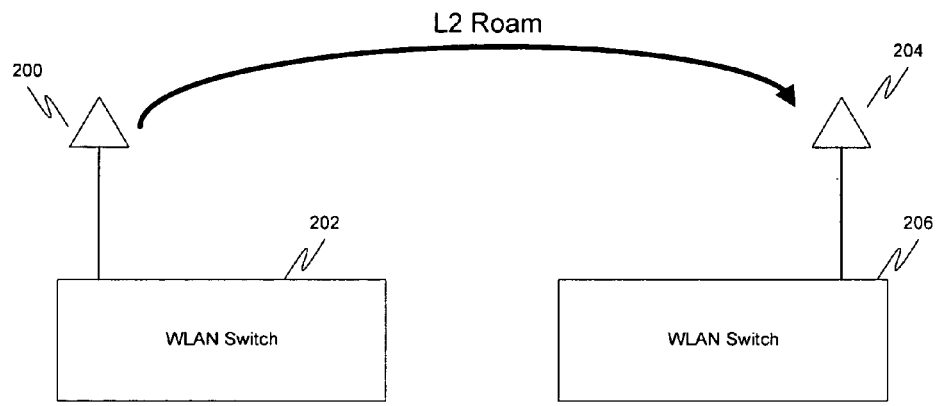
FIG. 2 is a diagram illustrating layer 2 roaming between two WLAN switches in accordance with an embodiment of the present invention.

FIG. 2 is a diagram illustrating layer 2 roaming between two WLAN switches in accordance with an embodiment of the present invention. In this case, the client has roamed from an AP 200 connected to a first WLAN switch 202 to another AP 204 connected to a second WLAN switch 206. Here, the client's mobility context information should be moved from WLAN switch 202 to WLAN switch 206. Additionally, WLAN switch 206 should be designated as the new HA. WLAN switch 202 should then remove the client's layer 2 information from the bridging table, and then clean up the client's data structures.

Figure 3:
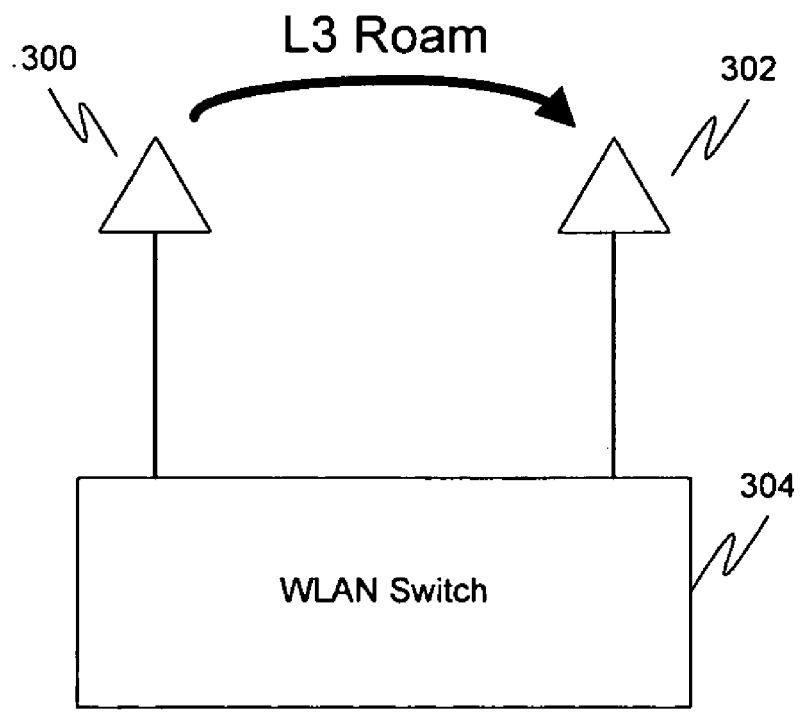
FIG. 3 is a diagram illustrating layer 3 roaming on a single WLAN switch in accordance with an embodiment of the present invention.

FIG. 3 is a diagram illustrating layer 3 roaming on a single WLAN switch in accordance with an embodiment of the present invention. In this case, the client has roamed from one AP 300 to another AP 302, both of which are connected to the same WLAN switch 304. Once again, there is not much that needs to be done here. WLAN switch 304 will be both the HA and the foreign agent (FA). However, if the VLAN has changed then the packets destined for the client should be forwarded to the CPU, which may modify it to reflect the correct VLAN tag.

Figure 4:
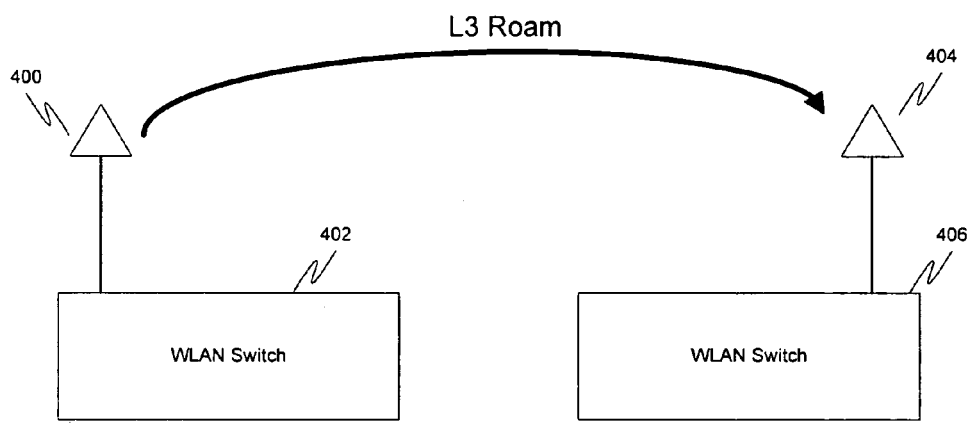
FIG. 4 is a diagram illustrating layer 3 roaming between two WLAN switches in accordance with an embodiment of the present invention.

FIG. 4 is a diagram illustrating layer 3 roaming between two WLAN switches in accordance with an embodiment of the present invention. In this case, the client has roamed from an AP 400 connected to a first WLAN switch 402 to another AP 404 connected to a second WLAN switch 404. Here, the client's mobility context information should be moved from A WLAN switch 402 to B WLAN switch 406. Then the first WLAN switch 402, being the HA, should tunnel the client's traffic to the second WLAN switch 406. The second WLAN switch 406 then should apply the client's policy to the port to which the client's associated AP is attached.

Figure 5:
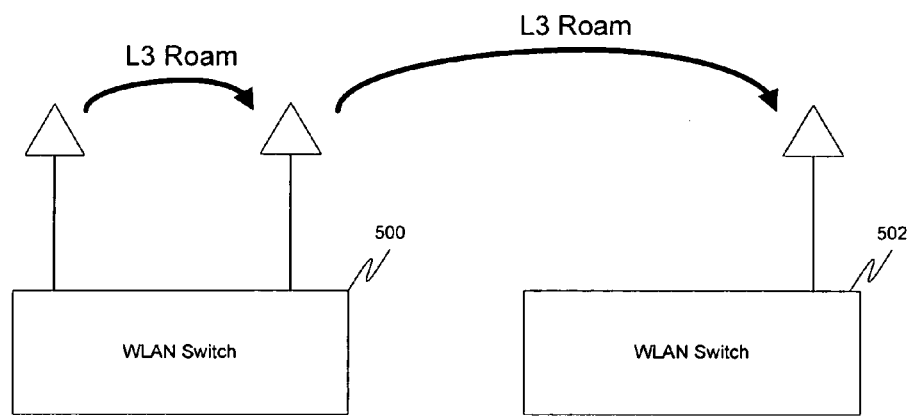
FIG. 5 is a diagram illustrating layer 3 roaming followed by another layer 3 roaming involving 2 WLAN switches in accordance with an embodiment of the present invention.

FIG. 5 is a diagram illustrating layer 3 roaming followed by another layer 3 roaming involving 2 WLAN switches in accordance with an embodiment of the present invention. In this case, the client has roamed twice. After the first layer 3 roam, the first WLAN switch 500 will be both the HA and the FA. No tunneling is needed as the client is still connected to the same WLAN switch 500. However, VLAN tag addition or replacement may need to be performed. After the second layer 3 roam, the second WLAN switch 502 will become the new FA and the following should be performed. First, the client's mobility context information should be moved from the first WLAN switch 500 to the second WLAN switch 502. The first WLAN switch 500, being the HA, should then tunnel the client's traffic to the second WLAN switch 502. Then the second WLAN switch 502 should apply the client's policy to the port to which the client's associate AP is attached. Finally, the second WLAN switch 502 should extract the packet from the IP in IP encapsulation, make the necessary VLAN changes, and forward the packet to the client.

Figure 6:
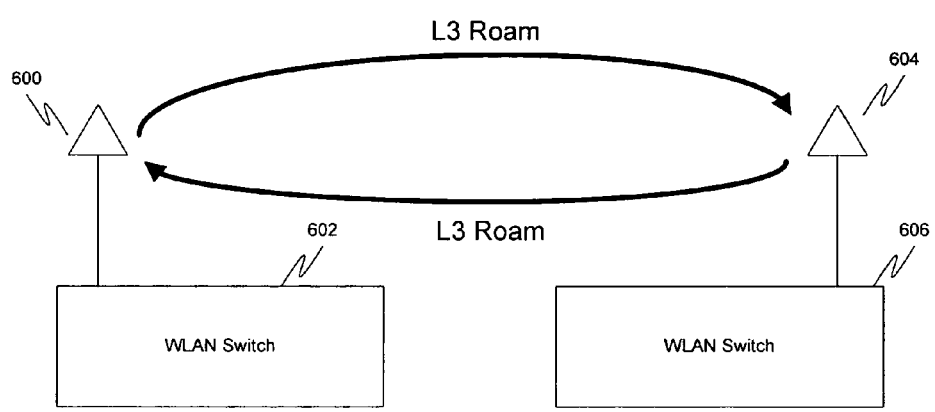
FIG. 6 is a diagram illustrating layer 3 roaming to a different WLAN switch followed by another layer 3 roaming back to the original WLAN switch in accordance with an embodiment of the present invention.

FIG. 6 is a diagram illustrating layer 3 roaming to a different WLAN switch followed by another layer 3 roaming back to the original WLAN switch in accordance with an embodiment of the present invention. In this case, the client first layer 3 roamed from an AP 600 connected to a first WLAN switch 602 to an AP 604 connected to a second WLAN switch 606. This part is the same as the case described by FIG. 4 and the accompanying text, and thus the same steps should be taken. On the second layer 3 roam, the client gets associated with an AP (600, or possibly another AP) connected to the original WLAN switch 602. What is performed here depends on whether the client roamed back to the same VLAN. If so, then there is no FA. If not, then the original WLAN switch 602 will be both the HA and the FA.

Figure 7:
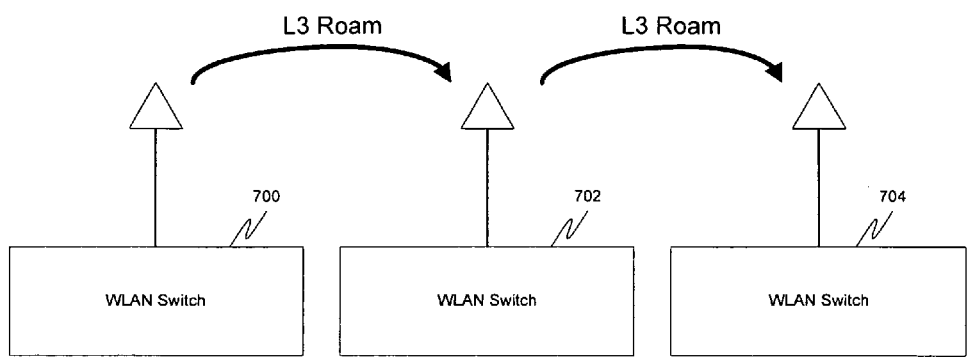
FIG. 7 is a diagram illustrating layer 3 roaming followed by another layer 3 roaming on 3 or more WLAN switches in accordance with an embodiment of the present invention.

FIG. 7 is a diagram illustrating layer 3 roaming followed by another layer 3 roaming on 3 or more WLAN switches in accordance with an embodiment of the present invention. In this case, the client has layer 3 roamed twice. The first roam is similar to the case described by FIG. 4 and the accompanying text, and thus the same steps should be taken. On the second layer 3 roam, the client's mobility context information should be copied from the HA (WLAN switch 700) to the new FA (WLAN switch 704). Then IP in IP tunneling of the client's traffic should be performed by the HA. The old FA (WLAN switch 702) should then clean up the client's data structures.

Figure 8:
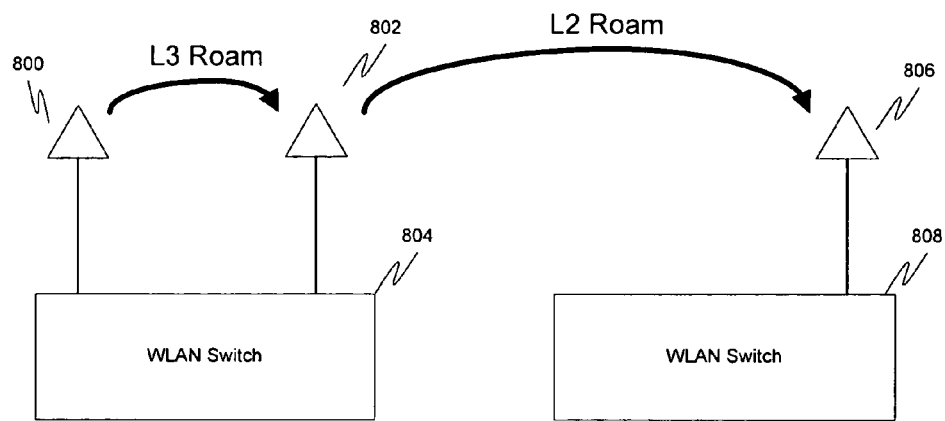
FIG. 8 is a diagram illustrating layer 3 roaming followed by layer 2 roaming involving 2 WLAN switches in accordance with an embodiment of the present invention.

FIG. 8 is a diagram illustrating layer 3 roaming followed by layer 2 roaming involving 2 WLAN switches in accordance with an embodiment of the present invention. In this case, the client has first roamed from AP 800 to AP 802, both of which are connected to the same WLAN switch 804. Next, the client roamed from AP 802 to AP 806, which is connected to another WLAN switch 808. After the first roam, WLAN switch 804 is both the HA and the FA for the client, which is similar to the case described by FIG. 3 and the accompanying text, and thus the same steps should be performed. After the second layer 2 roam, the case becomes similar to the case described by FIG. 2 and the accompanying text, and thus the same steps should be performed.

Figure 9:
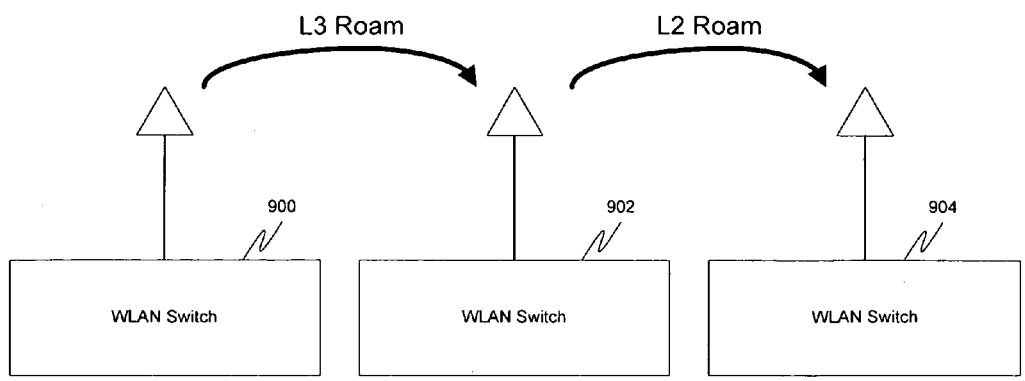
FIG. 9 is a diagram illustrating layer 3 roaming followed by layer 2 roaming on 3 or more WLAN switches in accordance with an embodiment of the present invention.

FIG. 9 is a diagram illustrating layer 3 roaming followed by layer 2 roaming on 3 or more WLAN switches in accordance with an embodiment of the present invention. In this case, the client has first roamed from an AP 900 connected to WLAN switch 902 to AP 904 connected to another WLAN switch 906. Next, the client roams from AP 904 to AP 908, which is connected to WLAN switch 910. After the first roam, WLAN Switch 902 is the HA and WLAN switch 906 is the FA for the client, and this case is similar to that described by FIG. 4 and the accompanying texts, and thus the same steps should be performed. After the second layer 2 roam, the WLAN switch 910 becomes the new FA and the following should be performed. First, the client's mobility context information should be copied from the HA (WLAN switch 902) to the new FA (WLAN switch 910). IP in IP tunneling of the client's traffic should then be performed by the HA. Finally, the old FA (WLAN switch 906) should clean up the client's data structures and any bridging information that it may have stored.

Figure 10:
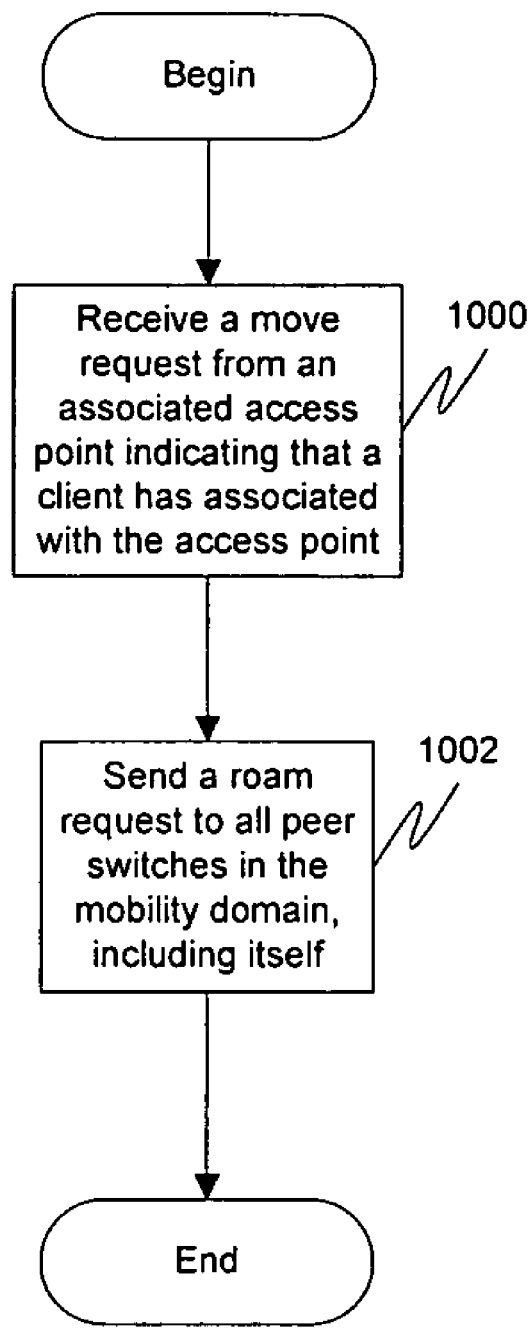
FIG. 10 is a flow diagram illustrating a method for responding to client roaming at a switch in accordance with an embodiment of the present invention.

FIG. 10 is a flow diagram illustrating a method for responding to client roaming at a switch in accordance with an embodiment of the present invention. At 1000, a move request may be received at the switch from an associated access point indicating that a client has associated with the access point. This may be, for example, a SAPP move message. Then, at 1002, the switch may send a roam request to all peer switches in the mobility domain, including itself. This may be, for example, an ISRP roam request.

Figure 11:
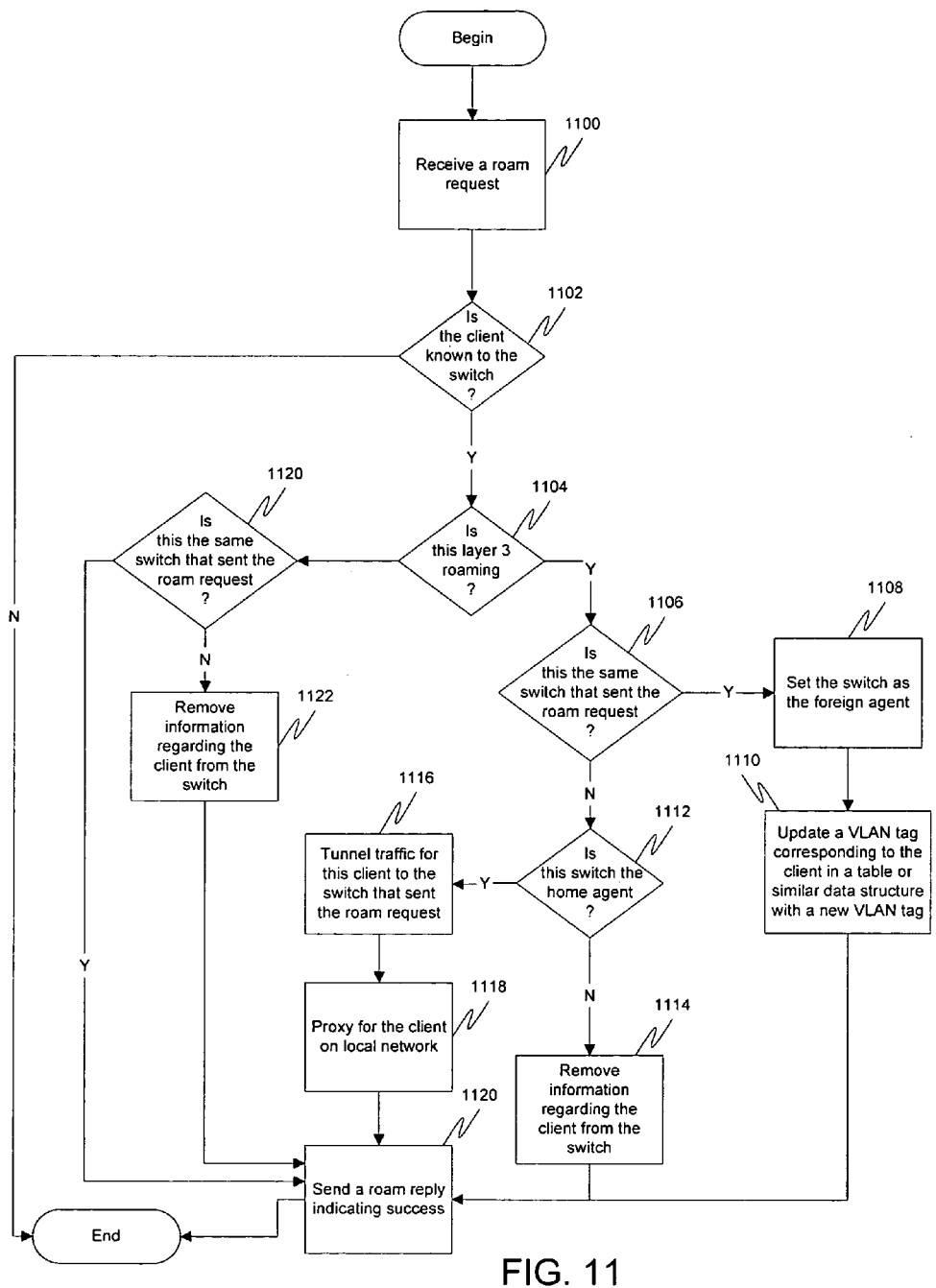
FIG. 11 is a flow diagram illustrating a method for handling a roam request from a switch in accordance with an embodiment of the present invention.

FIG. 11 is a flow diagram illustrating a method for handling a roam request from a switch in accordance with an embodiment of the present invention. This method may be run on any switch in the mobility domain, including the switch that sent the roam request in the first place. At 1100, roam request may be received from a switch. This roam request may be, for example, an ISRP roam request. The roam request may include an indication of the client that has roamed. At 1102, it may be determined if the client is known to this switch. This may include looking up the identification of the client in a table or similar data structure. If no such client can be found, then the roam request may simply be ignored. If on the other hand, the client is found, then at 1104 it may be determined if the roaming being attempted is layer 3 roaming. If so, then at 1106 it may be determined if the switch is the same as the switch that sent the roam request. This may include, for example, seeing if the source network address of the roam request matches the network address of the switch. Such a case could occur if, for example, the client is roaming between two VLANs serviced by the same switch. If it is the same switch, then at 1108 this switch may be set as the foreign agent. Then at 1110, a VLAN tag corresponding to the client in a table or similar data structure may be updated with a new VLAN tag. This may act to change the VLAN that packets to this client will be forwarded to upon receipt by the switch.

If at 1106 it was determined that the WLAN switch was not the same WLAN switch that sent the roam request, then at 1112 it may be determined if the switch is the Home Agent for the client. If not, then at 1114, information regarding the client may be removed from the switch. This may make it such that the client is no longer "known" to this switch. If, however, the switch is the Home Agent for the client, then at 1116, traffic for this client may be tunneled to the switch that sent the roam request. Then, at 1118, the switch may proxy for the client on the local (old) network. Finally, at 1120, a roam reply indicating success may be sent to the switch that sent the roam request. This roam reply may include all network configuration information (e.g., IP address) for the client from the switch. This may be also be performed after step 1110.

If at 1104 it was determined that it was not layer 3 roaming (but instead was layer 2 roaming), then at 1120, it may be determined if the switch is the same switch that sent the roam request. If not, then at 1122, information regarding the client may be removed from the switch. Then the process may move to 1118. If not, then the process may simply move to 1118.

It should be noted that at 1118, the switch may instead send a roam reply indicating failure if something went wrong during the process, such as the failure in tunnel establishment.

Figure 12:
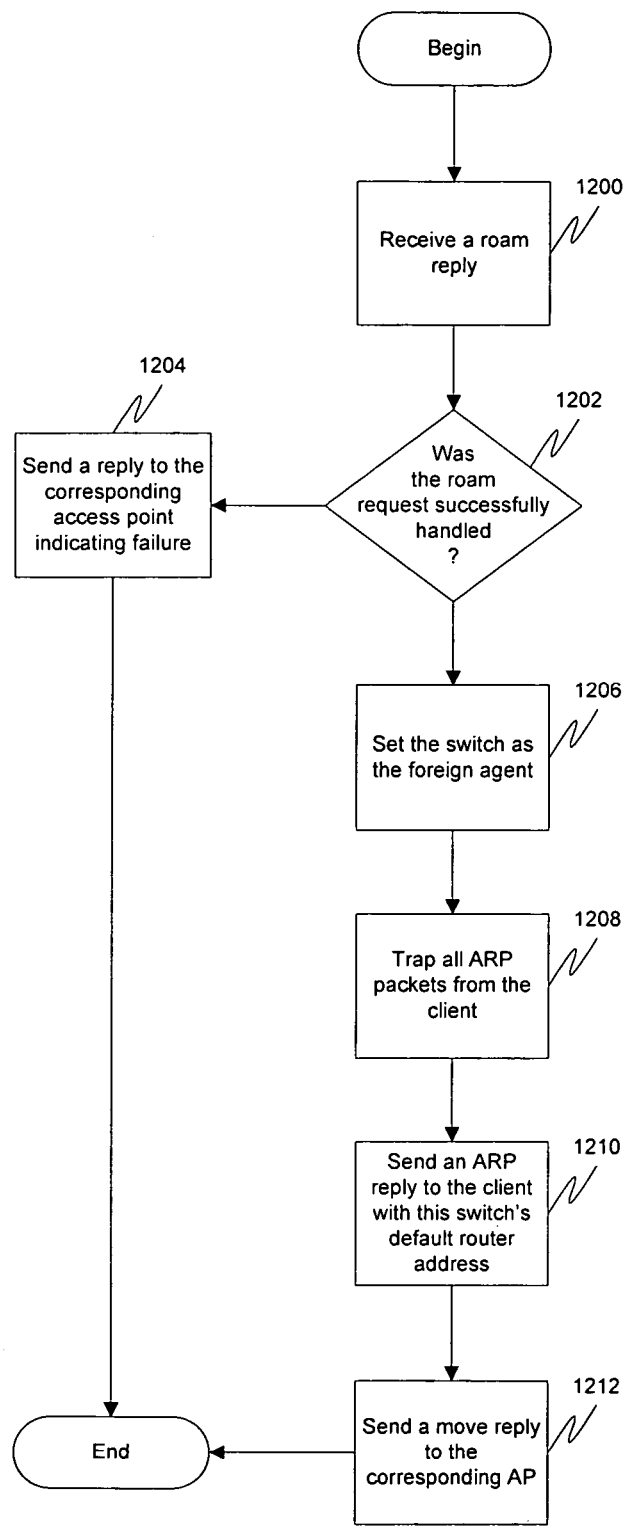
FIG. 12 is a flow diagram illustrating a method for handling a roam reply in a switch in accordance with an embodiment of the present invention.

FIG. 12 is a flow diagram illustrating a method for handling a roam reply in a switch in accordance with an embodiment of the present invention. This method may be run on a switch that sent a roam request. At 1200, a roam reply may be received. At 1202 it may be determined if the roam reply indicates that the handling of a roam request was successful or not. If not, then at 1204 a reply to the corresponding access point may be sent indicating failure. This may be sent via a SAPP reply. If the handling of the roam request was successful, then at 1206, the switch may be set as the Foreign Agent. At this point, if the client attempts to send packets, it will likely still be referencing a router address located in the old domain. In order to remedy this, at 1208 all Address Resolution Protocol (ARP) packets from the client should be trapped. Then at 1210, an ARP reply may be sent to the client with this switch's default router address. This causes the client to correctly send out data traffic having a usable router address. Then at 1212, a move reply may be sent to the corresponding AP. In this reply, the new VLAN identification may also be passed to the AP. This reply may be a SAPP reply. The AP may then start to tag the client's traffic with the new VLAN tag.

Figure 13:
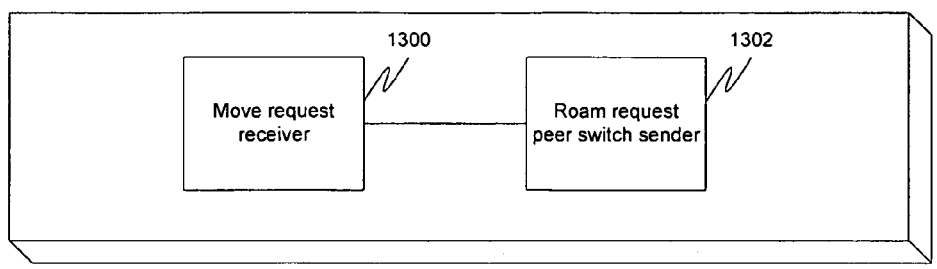
FIG. 13 is a block diagram illustrating an apparatus for responding to client roaming at a switch in accordance with an embodiment of the present invention.

FIG. 13 is a block diagram illustrating an apparatus for responding to client roaming at a switch in accordance with an embodiment of the present invention. A move request receiver 1300 may receive a move request at the switch from an associated access point indicating that a client has associated with the access point. This may be, for example, a SAPP move message. Then, a roam request peer switch sender 1302 coupled to the move request receiver 1300 may may send a roam request to all peer switches in the mobility domain, including itself. This may be, for example, an ISRP roam request.

Figure 14:
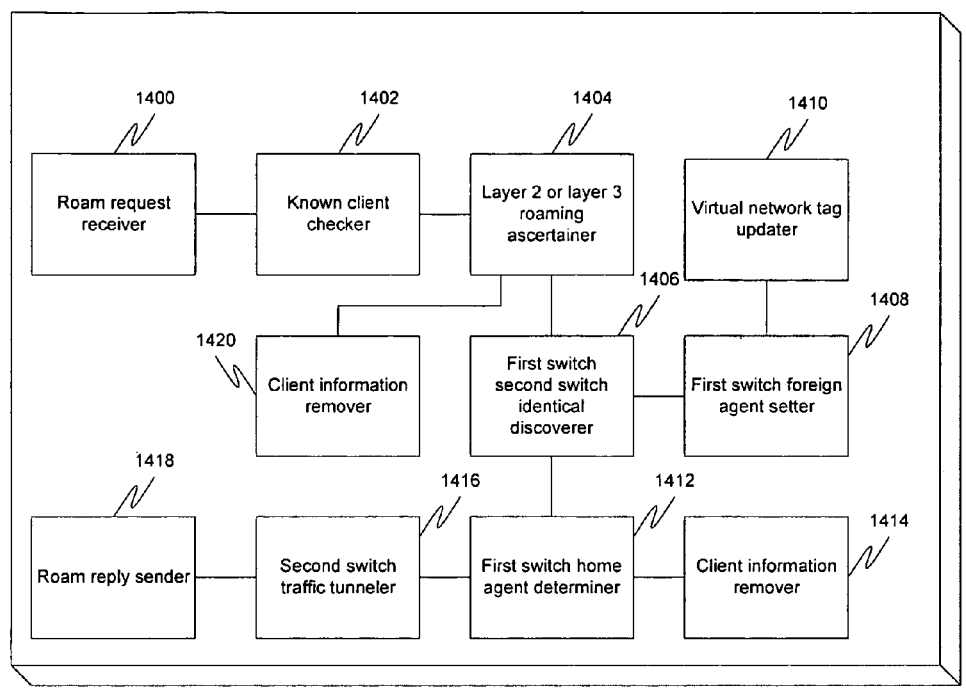
FIG. 14 is a block diagram illustrating an apparatus for handling a roam request from a switch in accordance with an embodiment of the present invention.

FIG. 14 is a block diagram illustrating an apparatus for handling a roam request from a switch in accordance with an embodiment of the present invention. This apparatus may be located on any switch in the mobility domain, including the switch that sent the roam request in the first place. A roam request receiver 1400 may receive the roam request from a switch. This roam request may be, for example, an ISRP roam request. The roam request may include an indication of the client that has roamed. A known client checker 1402 coupled to the roam request receiver 1400 may determine if the client is known to this switch. This may include looking up the identification of the client in a table or similar data structure. If no such client can be found, then the roam request may simply be ignored. If on the other hand, the client is found, then a layer 2 or layer 3 roaming ascertainer 1404 coupled to the known client checker 1402 may determine if the roaming being attempted is layer 3 roaming. If so, then a first switch second switch identical discoverer 1406 coupled to the layer 2 or layer 3 roaming ascertainer 1404 may determine if the switch is the same as the switch that sent the roam request. This may include, for example, seeing if the source network address of the roam request matches the network address of the switch. Such a case could occur if, for example, the client is roaming between two VLANs serviced by the same switch. If it is the same switch, then a first switch foreign agent setter 1408 coupled to the first switch second switch identical discoverer 1406 may set this switch as the foreign agent. Then a virtual network tag updater 1410 coupled to the first switch foreign agent setter 1408 may update a VLAN tag corresponding to the client in a table or similar data structure with a new VLAN tag. This may act to change the VLAN that packets to this client will be forwarded to upon receipt by the switch.

If it was determined that the WLAN switch was not the same WLAN switch that sent the roam request, then a first switch home agent determiner 1412 may determine if the switch is the Home Agent for the client. If not, then a client information remover 1414 coupled to the first switch home agent determiner 1412 may remove information regarding the client from the switch. This may make it such that the client is no longer "known" to this switch. If, however, the switch is the Home Agent for the client, then a second switch traffic tunneler 1416 coupled to the first switch home agent determiner 1412 may tunnel traffic for this client to the switch that sent the roam request. Then the switch may proxy for the client on the local (old) network. Finally, a roam reply sender 1418 coupled to the client information remover 1414 and to the second switch traffic tunneler 1416 may send a roam reply indicating success to the switch that sent the roam request. This roam reply may include all network configuration information (e.g., IP address) for the client from the switch.

If it was determined that it was not layer 3 roaming (but instead was layer 2 roaming), then it may be determined if the switch is the same switch that sent the roam request. If not, then a client information remover 1420 coupled to the layer 2 or layer 3 roaming ascertainer 1404 may remove information regarding the client from the switch. If so, nothing special needs to be done.

It should be noted that the switch may instead send a roam reply indicating failure if something went wrong during the process, such as the failure in tunnel establishment.

Figure 15:
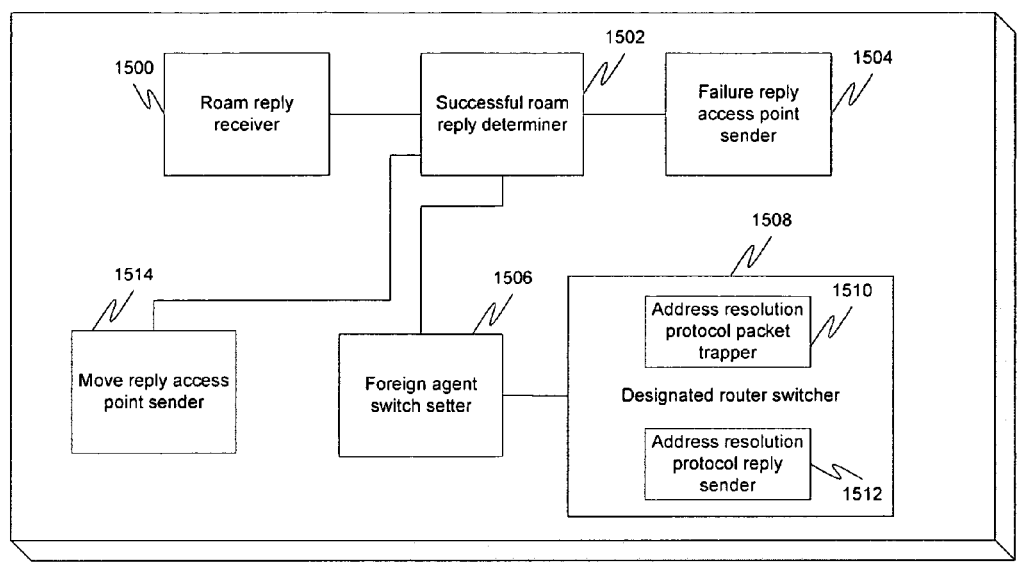
FIG. 15 is a block diagram illustrating a method for handling a roam reply in a switch in accordance with an embodiment of the present invention.

FIG. 15 is a block diagram illustrating a method for handling a roam reply in a switch in accordance with an embodiment of the present invention. This apparatus may be located on a switch that sent a roam request. A roam reply receiver 1500 may receive a roam reply. A successful roam reply determiner 1502 coupled to the roam reply receiver 1500 may determine if the roam reply indicates that the handling of a roam request was successful or not. If not, then a failure reply access point sender 1504 coupled to the successful reply determiner 1502 may send a reply to the corresponding access point may be sent indicating failure. This may be sent via a SAPP reply. If the handling of the roam request was successful, then a foreign agent switch setter 1506 coupled to the successful roam reply determiner 1502 may set the switch as the Foreign Agent. At this point, if the client attempts to send packets, it will likely still be referencing a router address located in the old domain. In order to remedy this, a designated router switcher 1508 coupled to the foreign agent switch setter 1506 may switch a router designated by the client with a default router for the switch. This may include an address resolution protocol packet trapper 1510, which may trap all Address Resolution Protocol (ARP) packets from the client, and an address resolution protocol reply sender 1512 coupled to the address resolution protocol packet trapper 1510, which may send an ARP reply to the client with this switch's default router address. This causes the client to correctly send out data traffic having a usable router address. Then a move reply access point sender 1514 coupled to the successful roam reply determiner 1502 may send a move reply to the corresponding AP. In this reply, the new VLAN identification may also be passed to the AP. This reply may be a SAPP reply. The AP may then start to tag the client's traffic with the new VLAN tag.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for handling a roam request at a first switch, the roam request sent by a second switch and containing information about the client that is roaming to the second switch, the method comprising:

receiving the roam request at the first switch;

determining, in response to said receiving, if the first switch has stored information regarding the client;

if the first switch has stored information regarding the client, determining if the first switch is a home agent for the client;

if the first switch has stored information regarding the client and is determined not to be the home agent, removing the stored information regarding the client from the first switch;

tunneling traffic for the client to the second switch if the first switch is determined to be a home agent for the client;

sending a roam reply to the second switch;

discovering if the first switch is the same as the second switch by determining if the roam request received by the first switch was also sent by the first switch;

performing said determining, removing, and tunneling only if the first switch is not the same as the second switch;

setting the first switch as the foreign agent if the first switch is the same as the second switch; and updating a virtual network tag corresponding to the client in a data structure controlled by the first switch if the first switch is the same as the second switch.

2. The method of claim 1, wherein said updating includes updating a virtual local area network (VLAN) tag corresponding to the client with a new VLAN tag corresponding to a new VLAN to which the client has roamed.

3. The method of claim 1, further comprising:

ascertaining if the roaming being attempted is layer 2 or layer 3 roaming;

executing said performing and setting only if the roaming being attempted is layer 3 roaming;

removing information regarding the client from a data structure controlled by the first switch.

4. The method of claim 3, further comprising:

checking if the client is known to the first switch;

performing said ascertaining, executing, and removing only if the client is known to the first switch.

5. An apparatus for handling a roam request at a first switch, the roam request sent by a second switch and containing information about a client that is roaming to the second switch, the apparatus comprising:

a known client checker operative to determine if the client is known to the first switch by determining if information regarding the client is stored by the first switch;

a first switch home agent determiner operative to determine, if the client is known to the first switch, whether the first switch is a home agent of the client;

a client information remover coupled to said first switch home agent determiner, the client information remover operative to remove the information regarding the client in response to a determination by the determiner that the first switch is not a home agent of the client;

a second switch traffic tunneler coupled to said first switch home agent determiner, the second switch traffic tunneler operative to tunnel traffic to the client in response to a determination by the determiner that the first switch is a home agent of the client;

a roam reply sender coupled to said client information remover and to said second switch traffic tunneler;

a first switch second switch identical discoverer coupled to said first switch home agent determiner, said client information remover, and said second switch traffic tunneler;

a first switch foreign agent setter coupled to said first switch second switch identical discoverer; and a virtual network tag updater coupled to said first switch foreign agent setter.

6. The apparatus of claim 5, further comprising:

a layer 2 or layer 3 roaming ascertainer coupled to said first switch second switch identical discoverer, said first switch foreign agent setter, and said virtual network tag updater; and a client information remover coupled to said layer 2 or layer 3 roaming ascertainer.

7. The apparatus of claim 6, further comprising:

a known client checker coupled to said layer 2 or layer 3 roaming ascertainer and to said client information remover.

8. An apparatus for handling a roam request at a first switch, the roam request sent by a second switch and containing information about the client that is roaming to the second switch, the apparatus comprising:

means for receiving the roam request at the first switch;

means for determining, in response to receipt of the roam request by the means for receiving, if the first switch has stored information regarding the client;

means for determining, if the first switch has stored information regarding the client, whether the first switch is a home agent for the client;

means for removing the stored information regarding the client from the first switch if the first switch is not a home agent for the client;

means for tunneling traffic for the client to the second switch if the first switch is a home agent for the client;

means for sending a roam reply to the second switch means for discovering if the first switch is the same as the second switch;

means for performing said determining, removing, and tunneling only if the first switch is not the same as the second switch;

means for setting the first switch as the foreign agent if the first switch is the same as the second switch; and means for updating a virtual network tag corresponding to the client in a data structure controlled by the first switch if the first switch is the same as the second switch.

9. The apparatus of claim 8, wherein said means for updating includes means for updating a virtual local area network (VLAN) tag corresponding to the client with a new VLAN tag corresponding to a new VLAN to which the client has roamed.

10. The apparatus of claim 8, further comprising:

means for ascertaining if the roaming being attempted is layer 2 or layer 3 roaming;

means for executing said performing and setting only if the roaming being attempted is layer 3 roaming;

means for removing information regarding the client from a data structure controlled by the first switch.

11. The apparatus of claim 10, further comprising:

means for checking if the client is known to the first switch; and means for performing said ascertaining, executing, and removing only if the client is known to the first switch.

12. A computer readable medium encoded with computer executable instructions to perform a method for handling a roam request at a first switch, the roam request sent by a second switch and containing information about the client that is roaming to the second switch, the method comprising:

receiving the roam request at the first switch;

determining, in response to said receiving, if the first switch has stored information regarding the client;

if the first switch has stored information regarding the client, determining if the first switch is a home agent for the client;

if the first switch has stored information regarding the client and is determined not to be the home agent, removing the stored information regarding the client from the first switch;

tunneling traffic for the client to the second switch if the first switch is a home agent for the client;

sending a roam reply to the second switch;

discovering if the first switch is the same as the second switch by determining if the roam request received by the first switch was also sent by the first switch;

performing said determining, removing, and tunneling only if the first switch is not the same as the second switch;

setting the first switch as the foreign agent if the first switch is the same as the second switch; and updating a virtual network tag corresponding to the client in a data structure controlled by the first switch if the first switch is the same as the second switch.

13. A switch configurable for management of roaming by one or more mobile clients in a wireless network, the switch comprising:

a roam request receiver configured to receive a roam request, the roam request including an indication of a roaming client;

a known client checker configured to determine if the roaming client is known to the switch;

an ascertainer configured to determine, if the roaming client is known to the switch, whether or not the roaming client is conducting layer 3 roaming;

an identical discoverer configured to determine, if the roaming client is determined to be conducting layer 3 roaming, whether the roam request was sent by the switch or by another switch;

a foreign agent setter configured to set the switch as a foreign agent if the roaming client is determined to be conducting layer 3 roaming and roam request was sent by the switch;

a home agent determiner configured to determine, if the roam request was sent by the switch, whether the switch is a home agent of the roaming client;

a client information remover configured to remove information regarding the client from the switch if the switch is determined not to be the home agent of the roaming client; and a traffic tunneler configured to, if the switch is determined to be the home agent, tunnel traffic from the switch to the other.

14. A method for handling roam request received by a receiving switch, the roam request containing information regarding a roaming client that is roaming from one access point to another access point in a wireless network, the method comprising:

receiving the roam request;

checking whether the roaming client is known to the receiving switch;

if the roaming client is known to the receiving switch, determining if the roaming client is conducting layer 3 roaming;

if the roaming client is conducting layer 3 roaming, determining whether the roam request was sent by the receiving switch;

if the roaming client is conducting layer 3 roaming and the roam request was sent by the receiving switch, setting the receiving switch to be a foreign agent of the roaming client;

if the roam request was not sent by the receiving switch, determining if the receiving switch is a home agent of the roaming client;

if the roaming client is known to the receiving switch, the roam request was not sent by the receiving switch, and the receiving switch is not the home agent, removing any stored information about the roaming client from the receiving switch; and tunneling traffic to the sending switch from the receiving switch if the receiving switch is the home agent of the roaming client.

15. A system for handling roaming by a roaming client in a wireless network, the system comprising:

a first switch; and a second switch, wherein the first switch includes:

a known client checker operative to determine if the client is known to the first switch by determining if information regarding the client is stored by the first switch;

a first switch home agent determiner operative to determine if the first switch is a home agent of the client;

a client information remover coupled to said first switch home agent determiner, the client information remover operative to remove the information regarding the client in response to a determination by the determiner that the first switch is not a home agent of the client;

a second switch traffic tunneler coupled to said first switch home agent determiner, the second switch traffic tunneler operative to tunnel traffic to the client in response to a determination by the determiner that the first switch is a home agent of the client;

a roam reply sender coupled to said client information remover and to said second switch traffic tunneler;

a first switch second switch identical discoverer coupled to said first switch home agent determiner, said client information remover, and said second switch traffic tunneler;

a first switch foreign agent setter coupled to said first switch second switch identical discoverer; and a virtual network tag updater coupled to said first switch foreign agent setter.

* * * * *